(12) United States Patent
Koga et al.

(10) Patent No.: US 8,171,823 B2
(45) Date of Patent: May 8, 2012

(54) POWER SEAT DRIVING APPARATUS FOR VEHICLE

(75) Inventors: Yoshitaka Koga, Chiryu (JP); Hirokazu Suzumura, Aichi-gun (JP); Eiichiro Tsuji, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 421 days.

(21) Appl. No.: 12/556,984

(22) Filed: Sep. 10, 2009

(65) Prior Publication Data

US 2010/0060062 A1   Mar. 11, 2010

(30) Foreign Application Priority Data

Sep. 11, 2008   (JP) .................................. 2008-232853

(51) Int. Cl.
*F16H 48/12*   (2006.01)

(52) U.S. Cl. ........................................... 74/650; 74/425

(58) Field of Classification Search .................... 74/650, 74/425

See application file for complete search history.

(56) References Cited

U.S. PATENT DOCUMENTS

| | | | | |
|---|---|---|---|---|
| 3,106,997 A | * | 10/1963 | White | 192/215 |
| 3,600,977 A | * | 8/1971 | Bogie | 475/343 |
| 3,788,698 A | * | 1/1974 | Perkins | 297/373 |
| 4,521,055 A | * | 6/1985 | Fudala | 297/362 |
| 4,799,403 A | | 1/1989 | Dinkel et al. | |
| 5,997,090 A | * | 12/1999 | Baloche et al. | 297/367 R |
| 7,041,024 B2 | | 5/2006 | Becker et al. | |
| 2007/0157752 A1 | | 7/2007 | Knopfle et al. | |
| 2008/0119996 A1 | | 5/2008 | Hozumi et al. | |

FOREIGN PATENT DOCUMENTS

| | | |
|---|---|---|
| DE | 103 27 103 A1 | 12/2004 |
| JP | 11-311303 | 11/1999 |

OTHER PUBLICATIONS

U.S. Appl. No. 12/556,915, filed Sep. 10, 2009, Koga et al.
U.S. Appl. No. 12/748,708, filed Mar. 29, 2010, Koga, et al.

\* cited by examiner

*Primary Examiner* — Ha D. Ho
(74) *Attorney, Agent, or Firm* — Oblon, Spivak, McClelland, Maier & Neustadt, L.L.P.

(57) ABSTRACT

A power seat driving apparatus for a vehicle includes a moving unit and a decelerating mechanism, wherein the decelerating mechanism includes a driving gear to which a driving force is inputted, a driven gear engaged with the driving gear so as to be rotatably driven by the driving gear while decelerating a rotational speed of the driving force transmitted thereto, and a housing, at least one of the driving gear and the driven gear includes a shaft portion and a gear portion including a tooth portion, which engages with a tooth portion of the other one of the driving gear and the driven gear, an annular recessed portion is formed at a stepped portion between the gear portion and the shaft portion, the annular recessed portion, and the housing includes a bearing bore having a bearing surface and an annular protruding portion, which is fitted into the annular recessed portion.

17 Claims, 8 Drawing Sheets

POWER SEAT DRIVING APPARATUS FOR VEHICLE

CROSS REFERENCE TO RELATED APPLICATIONS

This application is based on and claims priority under 35 U.S.C. §119 to Japanese Patent Application 2008-232853, filed on Sep. 11, 2008 the entire content of which is incorporated herein by reference.

FIELD OF THE INVENTION

The present invention generally relates to a power seat driving apparatus for a vehicle having a decelerating mechanism for decelerating a driving force generated by a driving power source and transmitting the decelerated driving force to a mobile portion of a seat.

BACKGROUND

There exists a known seat apparatus for a vehicle, in which a motor, which serves as a driving source, and a decelerating mechanism for decelerating a driving force generated by the motor and transmitting the decelerated driving force to a mobile portion of the seat is combined, in order to adjust an inclination of a front portion of a seat cushion for the vehicle in an up-and-down direction of the seat and in order to slidably adjust a position of an entire seat in a front-rear direction of the vehicle. Generally, a gear decelerating mechanism is adapted as the decelerating mechanism. More specifically, the gear decelerating mechanism is a mechanism for establishing a predetermined deceleration ratio by engaging gears, so that a large torque is obtained in response to the deceleration ratio. In a seat apparatus for adjusting the inclination of the seat, plural deceleration portions are combined in order to output a larger torque to raise the seat.

Disclosed in US2007/0157752 and DE10327103 are rotational speed changing devices for vehicles, which may be adapted as the decelerating mechanism for the power seat driving apparatus for the vehicle. According to the rotational speed changing devices disclosed in US2007/0157752 and DE10327103, a worm and a helical gear are engaged with each other in order to largely decelerate a rotating speed of a motor while generating a torque necessary for operating the seat apparatus. Generally, such decelerating mechanism includes gears and a bearing portion formed at a housing or the like, which are made of metal, in order to enhance durability against a large load applied thereto. Furthermore, because a clearance needs to be ensured within the rotational speed changing device in order to ensure an allowance for assembling and in view of an operation of the rotational speed changing device (in view of meshing of the gears), a backlash may be generated when the rotational speed changing device is operated. Therefore, the metal needs to be used for the bearing portion, the housing and the like, so that the bearing portion and the housing endure a shock generated by the backlash. Furthermore, a noise is likely to be generated when the worm and the helical gear are engaged with each other because of the backlash. As a result, the noise may be transmitted to a compartment of the vehicle. On the other hand, according to a gear box mounting structure disclosed in JPH11-311303A, flange portions, which are provided at an output shaft, are configured so as to contact corresponding brackets, which are provided at a housing, so that a large load generated in an axial direction of an output shaft is also received by the flange portions in order to decrease a backlash. Accordingly, enhancing in accuracy in engagement between the worm and the helical gear while reducing the occurrence of the backlash within the rotational speed changing device is required in order to enhance a reliability of the rotational speed changing device, reduce a manufacturing costs and the like.

Disclosed in U.S. Pat. No. 4,799,403 is a gear adjusting apparatus for a vehicle, in which plural decelerating portions are combined because a sufficient reduction gear ratio is not established by using a single decelerating mechanism. The gear adjusting apparatus for the vehicle disclosed in U.S. Pat. No. 4,799,403 includes a first decelerating portion, which is configured with a worm and a helical gear, and a second decelerating mechanism, which is configured with a planetary gear mechanism. The first decelerating portion and the second decelerating mechanism are connected in series. According to the gear adjusting apparatus for the vehicle disclosed in U.S. Pat. No. 4,799,403, a clearance ensured at the gear adjusting apparatus for the vehicle is decreased and a backlash generated when the worm and the helical gear are engaged with each other is decreased by using the planetary gear mechanism.

In these days, downsizing and cost-reduction of the decelerating mechanism are required. However, the gear and the bearing portion disclosed in US2007/0157752 and DE10327103 are relatively heavy because the gear and the bearing portion are made of the metal. Furthermore, processing of the metal-made gear and the bearing portion used for US2007/0157752 and DE10327103 is inefficient. Therefore, if the gear and the bearing portion are made of resin, the processing efficiency may be improved. However, the accuracy in engagement between the gears needs to be ensured, and furthermore, a mechanism strength of the gear and the bearing portion needs to be ensured. On the other hand, according to the gear adjusting apparatus for the vehicle disclosed in U.S. Pat. No. 4,799,403, the second decelerating portion, which is configured with the planetary gear mechanism, may reduce the backlash, however, a size of the second decelerating mechanism is relatively large. Furthermore, a number of components used for the second decelerating gear is relatively large. Therefore, the manufacturing costs of the gear adjusting apparatus for the vehicle is relatively high. Accordingly, there exists a need to provide a decelerating mechanism, which has a simple configuration, which is lightweighted and which is manufactured with relatively low costs.

A need thus exists to provide a power seat driving apparatus for a vehicle, which is not susceptible to the drawback mentioned above.

SUMMARY OF THE INVENTION

According to an aspect of the present invention, a power seat driving apparatus for a vehicle includes a moving unit for freely moving a seat relative to a vehicle floor, and a decelerating mechanism for decelerating a driving force generated by a driving source and transmitting a decelerated driving force to the moving unit, wherein the decelerating mechanism includes a driving gear to which the driving force generated by the driving source is inputted, a driven gear engaged with the driving gear so as to be rotatably driven in response to a rotation of the driving gear while decelerating a rotational speed of the driving force transmitted to the driving gear, and a housing rotatably supporting the driving gear and the driven gear, at least one of the driving gear and the driven gear includes a shaft portion formed in a cylindrical shape so as to extend along a rotational axis, and a gear portion formed coaxially with the shaft portion so that a diameter of the gear portion is set to be greater than a diameter of the shaft portion and including a tooth portion, which engages with a tooth portion formed at the other one of the driving gear and the driven gear, an annular recessed portion is formed at a stepped portion between the gear portion and the shaft portion so as to be coaxial with the rotational axis, the annular recessed portion includes a radially inner circumferential surface whose diameter is set to be the same degree as the diameter of the shaft portion and a radially outer circumferential surface, whose diameter is set to be smaller than a diameter of a base portion of the tooth portion, and the housing includes a bearing bore having a bearing surface, which contacts an outer circumferential surface of the shaft portion and the radially inner circumferential surface of the annular recessed portion and an annular protruding portion, which is fitted into the annular recessed portion and which includes an auxiliary bearing outer circumferential surface contacting the radially outer circumferential surface.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

First Embodiment

Figure 1:
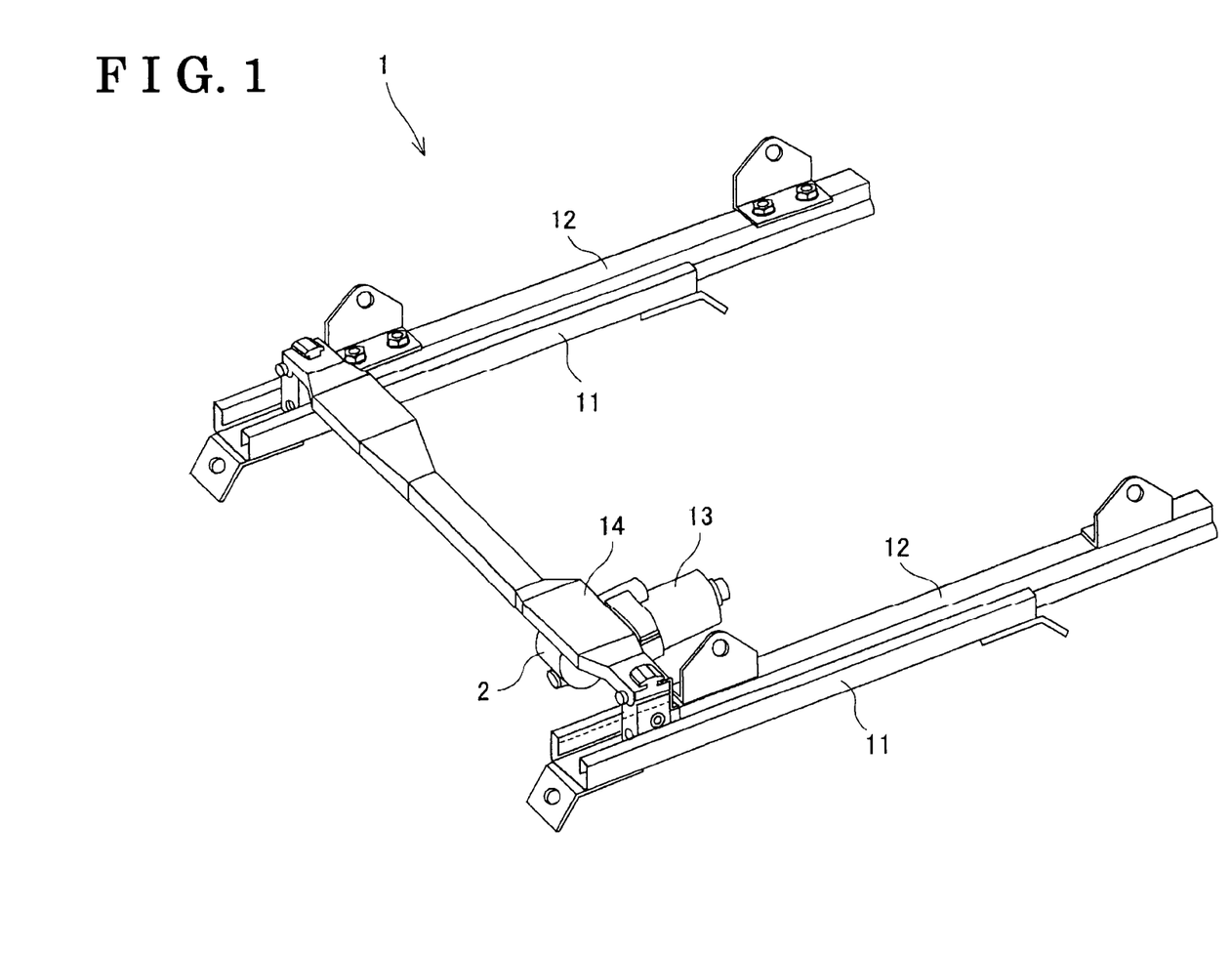
FIG. 1 is a perspective view illustrating an entire configuration of a power seat driving apparatus according to a first embodiment.

A first embodiment of a power seat driving apparatus for a vehicle (which will be hereinafter referred to simply as a power seat driving apparatus) will be described below with reference to FIGS. 1 to 4. Illustrated in FIG. 1 is a perspective view illustrating an entire configuration of a seat slide apparatus 1 for a vehicle, to which the power seat driving apparatus is adapted. The seat slide apparatus 1 adjusts a position of a seat in a front-rear direction of the vehicle. Furthermore, the seat slide apparatus 1 includes a pair of lower rails 11, which are arranged in parallel to each other so as to extend in the front-rear direction, a pair of upper rails 12, which are slidably supported by the respective lower rails 11 and which supports the seat, nut members, which are provided at the respective lower rails 11 so as not to be rotatable, screw members, which are rotatably supported by the respective upper rails 12 and which are engaged with the respective nut members, a motor 13, which serves as a driving source, a decelerating mechanism 2 and a transmitting mechanism. The screw members, which are provided at the right and left sides relative to the motor 13, are actuated by the motor 13 via the decelerating mechanism 2 and the transmitting mechanism. A reinforcing bracket 14 is provided between the pair of the upper rails 12 so as to connect the pair of the upper rails 12, which extend in the front-rear direction, so that the reinforcing bracket 14 extends orthogonally relative to the pair of the upper rails 12. The decelerating mechanism 2 and the motor 13 are integrally provided at a lower portion of the reinforcing bracket 14. In a case where the diving force is generated by the motor 13, a rotational speed of the generated driving force is decelerated by the decelerating mechanism 2 and the decelerated driving force is divided by the transmitting mechanism, so that the driving force is equally transmitted to the screw members, which are arranged at the right and left sides relative to the motor 13 and the transmitting mechanism. As a result, the upper rails 12 slide along the respective lower rails 11. Accordingly, the position of the seat is adjusted to any desired position. Additionally, the transmitting mechanism, the screw members, the upper rails 12 and the reinforcing bracket 14 serve as a moving unit of the seat.

Figure 2:
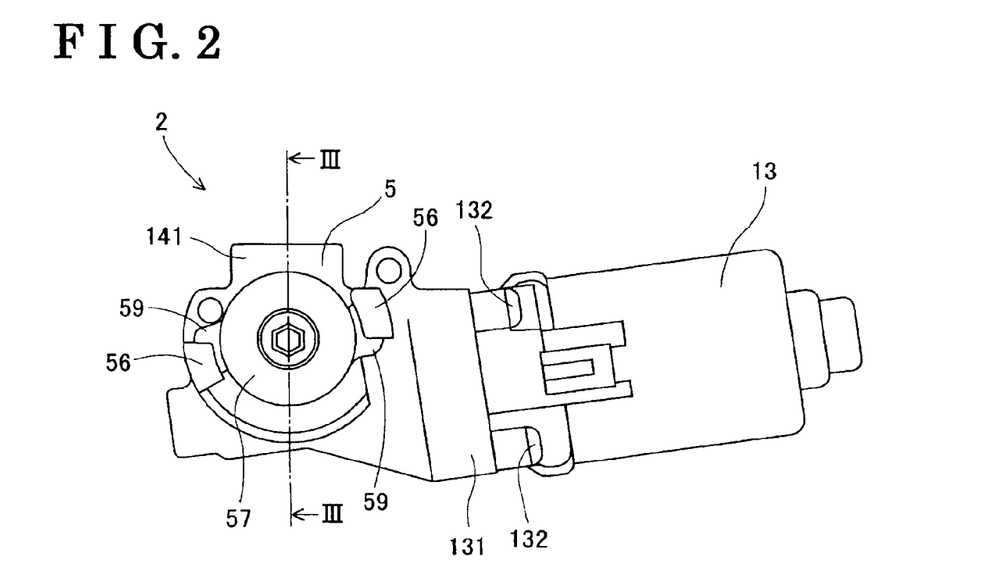
FIG. 2 is an external view of a decelerating mechanism according to the first embodiment.
Figure 3:
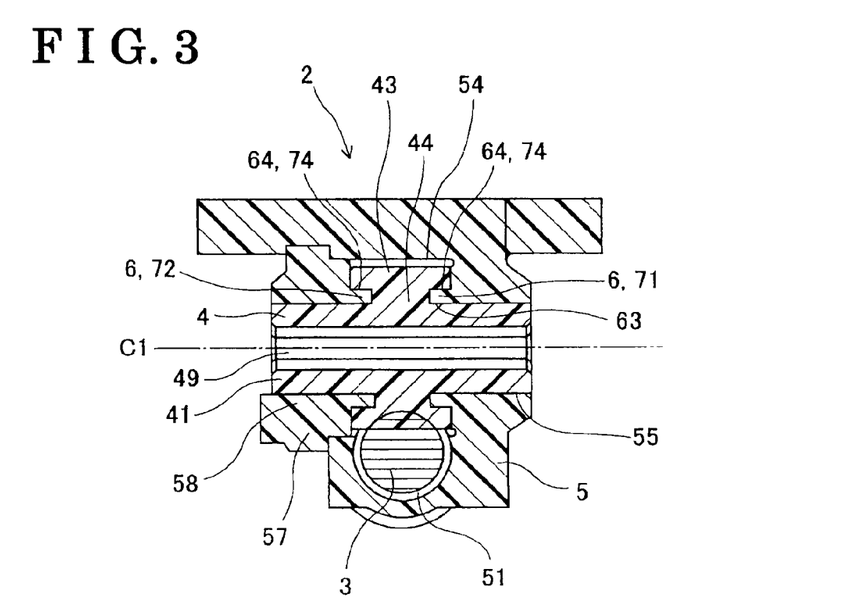
FIG. 3 is a cross-sectional view of the decelerating mechanism taken along line III-III in FIG. 2.
Figure 4:
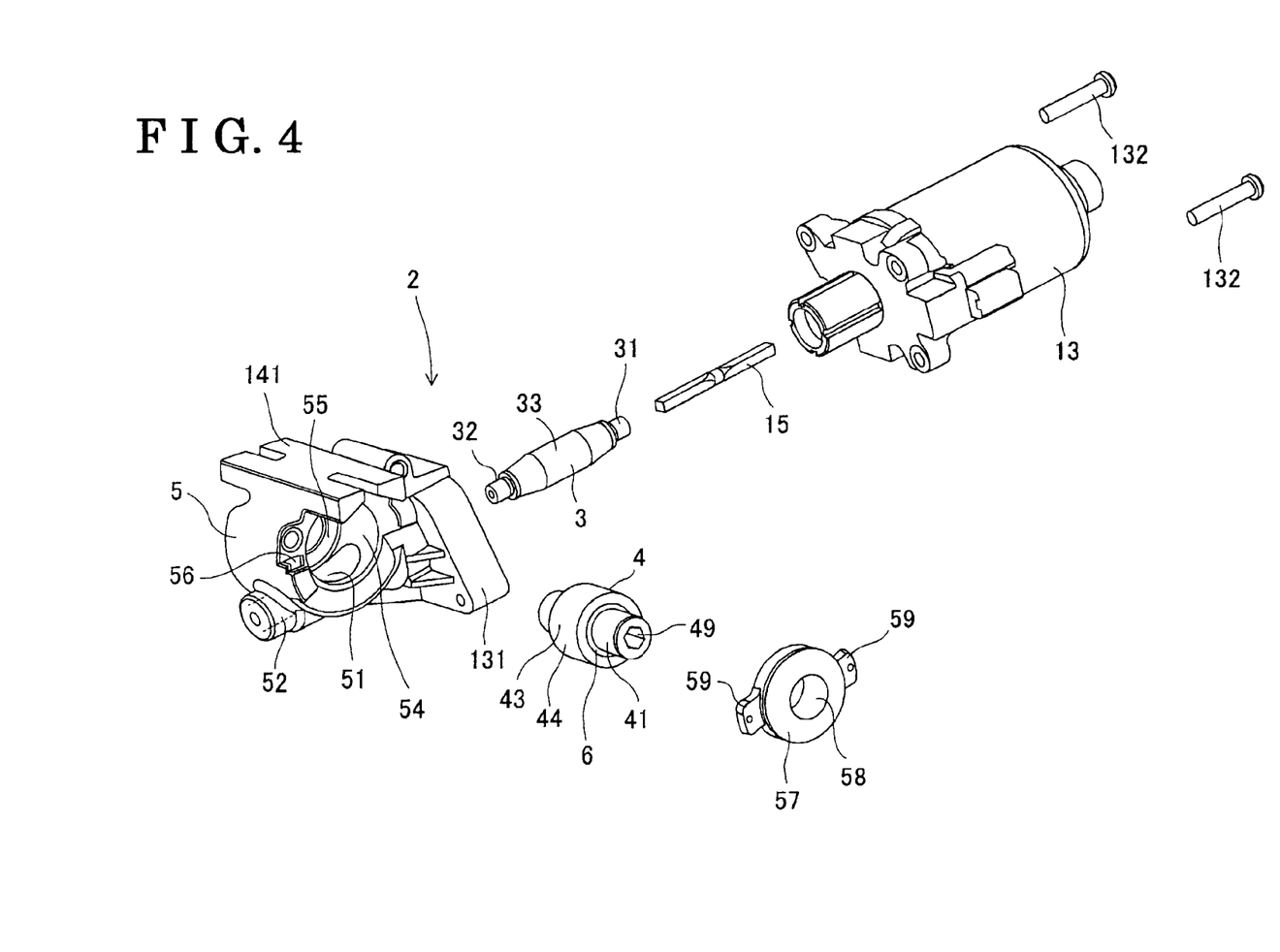
FIG. 4 is an exploded perspective view of the decelerating mechanism.

Illustrated in FIG. 2 is an external view of the decelerating mechanism 2 according to the first embodiment. Illustrated in FIG. 3 is a cross-sectional view of the decelerating mechanism 2 taken along line III-III in FIG. 2. Furthermore, illustrated in FIG. 4 is an exploded perspective view of the decelerating mechanism 2. As illustrated in FIGS. 3 and 4, the decelerating mechanism 2 includes a worm 3, which serves as a driving gear of the decelerating mechanism 2, a helical gear 4, which serves as a driven gear of the decelerating mechanism 2, and a housing 5. The worm 3 includes a main body and shaft portions 31 and 32, which extend from end portions of the main body of the worm 3, respectively, in an axial direction of the worm 3. A diameter of the shaft portion 31 is set to be the same size as a diameter of the shaft portion 32. The main body of the worm 3 is configured so that a diameter thereof is enlarged at an intermediate portion thereof in the axial direction of the worm 3. Furthermore, a tooth portion 33 is formed on an outer circumferential surface of the main body, whose diameter is enlarged. The shaft portion 31 is connected to the motor 13 (i.e. a driving motor 13) via a joint member 15. The joint member 15 is configured so that a cross-sectional surface of each end portions thereof forms a quadrangle. Accordingly, the worm 3 is integrally rotated with the motor 13.

The helical gear 4 includes a shaft portion 41, which is formed in a cylindrical portion so that a bore thereof extends in a rotational axis C1 in FIG. 3, and a gear portion 44. The gear portion 44, whose diameter is larger than a diameter of the shaft portion 41, is coaxially provided at an intermediate portion of the shaft portion 41. Furthermore, a tooth portion 43 is formed at an outer circumferential surface of the gear portion 44, so that the tooth portion 43 is engaged with the tooth portion 33 of the worm 3. As illustrated in FIG. 3, an annular recessed portion 6, whose center point corresponds to the rotational axis C1, is formed at each of stepped portions between the shaft portion 41 and the gear portion 44 in an axial direction of the helical gear 4. Furthermore, the annular recessed portion 6 is provided at each of the stepped portions between the shaft portion 41 and the gear portion 44 so that a diameter of a radially inner circumferential surface 63 defining the annular recessed portion 6 corresponds to the diameter of the shaft portion 41. Additionally, a radially outer circumferential surface 64 defining the annular recessed portion 6 is formed so that a diameter of the radially outer circumferential surface 64 becomes smaller than a diameter of a base portion of the tooth portion 43. A transmission bore 49, whose cross-section is formed in a sexangle shape, is formed so as to extend through an axial portion of the helical gear 4. A transmission shaft is fitted into the transmission bore 49 so as not to be rotatable with relative to each other. The driving force generated by the motor 13 is divided and transmitted by the transmission shaft to the right and left sides relative to the front-rear direction.

The housing 5 includes a worm accommodating bore 51 for accommodating therein the worm 3 and a helical gear accommodating bore 54 for accommodating therein the helical gear 4. As illustrated in FIG. 4, the worm accommodating bore 51 and the helical gear accommodating bore 54 are formed so as to extend orthogonally with relative to each other, while a portion of the worm accommodating bore 51 is overlapped with a portion of the helical gear accommodating bore 54, so the worm accommodating bore 51 becomes in communication with the helical gear accommodating bore 54. As a result, the worm 3 and the helical gear 4 are engaged orthogonally with relative to each other at the overlapped portion (i.e. the portion at which the worm accommodating bore 51 is in communication with the helical gear accommodating bore 54) within the housing 5. A diameter of the worm accommodating bore 3 is narrowed at one end portion thereof, so that the end portion of the worm accommodating bore 51 having the narrowed diameter serves as worm bearing bore 52. The shaft portion 32 of the worm 3 is rotatably supported by the worm bearing bore 52. A diameter of the helical gear accommodating bore 54 is narrowed at one end portion thereof, so that the end potion, whose diameter is narrowed, serves as a helical gear bearing bore 55. Furthermore, attachment seats 56 for supporting a bearing cover 57 are formed on the other end portion of the helical gear accommodating bore 54 so as to face each other (i.e. at positions thereof opposite to each other relative to an axial direction of the housing 5).

The bearing cover 57 is a member for covering the helical gear accommodating bore 54 from an outer side thereof in the axial direction of the housing 5 after the helical gear 4 is accommodated within the helical gear accommodating bore 54. As illustrated in FIGS. 3 and 4, the bearing cover 57 is formed in a substantially annular shape. Furthermore, a helical gear bearing bore 58 is formed at a center portion of the bearing cover 57. Two engagement flanges 59 are formed at an outer circumferential surface of the bearing cover 57 so as to outwardly extend in a radial direction of the bearing cover 57. The engagement flanges 59 are engaged with the respective attachment seats 56 so that the bearing cover 57 is fixed at the housing 5 via the engagement flanges 59 and the attachment seats 56 in a manner where the shaft portion 41 of the helical gear 4, which is accommodated within the helical gear accommodating bore 54, is inserted into the helical gear bearing bore 58 in the axial direction of the helical gear 4, and then, the bearing cover 57 is rotated until the engagement flanges 59 are engaged with the respective attachment seats 56. The helical gear bearing bore 55 of the housing 5 and the helical gear bearing bore 58 of the bearing cover 57 axially support the shaft portion 41 of the helical gear 4 while allowing the shaft portion 41 of the helical gear 4 to rotate freely.

As illustrated in FIG. 3, an annular protruding portion 71 is formed at an inner circumferential surface, which defines the helical gear bearing bore 55 of the housing 5, so as to extend in the rotational axis C1 into one of the annular recessed portions 6 formed at the helical gear 4. Similarly, an annular protruding portion 72 is formed at an inner circumferential surface of the bearing cover 57, which defines the helical gear bearing bore 58 of the bearing cover 57, so as to extend in the rotational axis C1 into the other one of the annular recessed portions 6 formed at the helical gear 4. As illustrated in FIG. 3, the annular protruding portion 71 of the housing 5 and the annular protruding portion 72 of the bearing cover 57 are engaged with the respective annular recessed portions 6, so that the annular protruding portion 71 of the housing 5 and the annular protruding portion 72 of the bearing cover 57 contact the respective annular recessed portions 6. Therefore, the reference numeral 71 (72), which indicates the annular protruding portion 71 of the housing (the annular protruding portion 72 of the bearing cover 57), and the reference numeral 6, which indicates the annular recessed portion 6, are provided as if the reference numerals 71 and 6 designate the same point in FIG. 3. Furthermore, an outer circumferential surface of each of the annular protruding portions 71 and 72 serves as an auxiliary bearing outer circumferential surface 74, which engages with a radially outer circumferential surface 64 of the respective annular recessed portions 6.

As illustrated in FIG. 4, the housing 5 includes a motor supporting flange 131, which is formed in a substantially rectangular shape extending from the housing 5 to the right in FIG. 4 and which includes an engagement bore at each of four corners. The motor 13 is integrally attached to the motor supporting flange 131 by means of screws 132 so that the motor 13 closely contacts the motor supporting flange 131. Furthermore, an attachment flange 141 is formed at an upper portion of the housing 5 in FIG. 4. More specifically, the attachment flange 141 is formed in a substantially rectangular shape and has two attachment grooves. The attachment flange 141 is fixed at the lower portion of the reinforcing bracket 14 by means of an attachment member, so that the housing 5 is fixed at the reinforcing bracket 141.

An operation of the seat slide apparatus 1 according to the first embodiment will be described below with reference specifically to the decelerating mechanism 2. When the motor 13 is started and actuated, the driving force having a rotational speed is inputted into the worm 3. Then, the inputted rotational speed of the driving force rotatably drives the helical gear 4, while the helical gear 4 decelerates the rotational speed of the driving force. The driving force (i.e. the rotation), whose rotational speed is decelerated by the helical gear 4, drives the screw portions provided at the right and left sides relative to the housing 5 (i.e. the motor 13) via the transmission shaft, which is inserted into the transmission bore 49. Accordingly, the upper rails 12 are slid in the front-rear direction in response to the rotation of the screw shafts, thereby adjusting the position of the seat.

Figure 5:
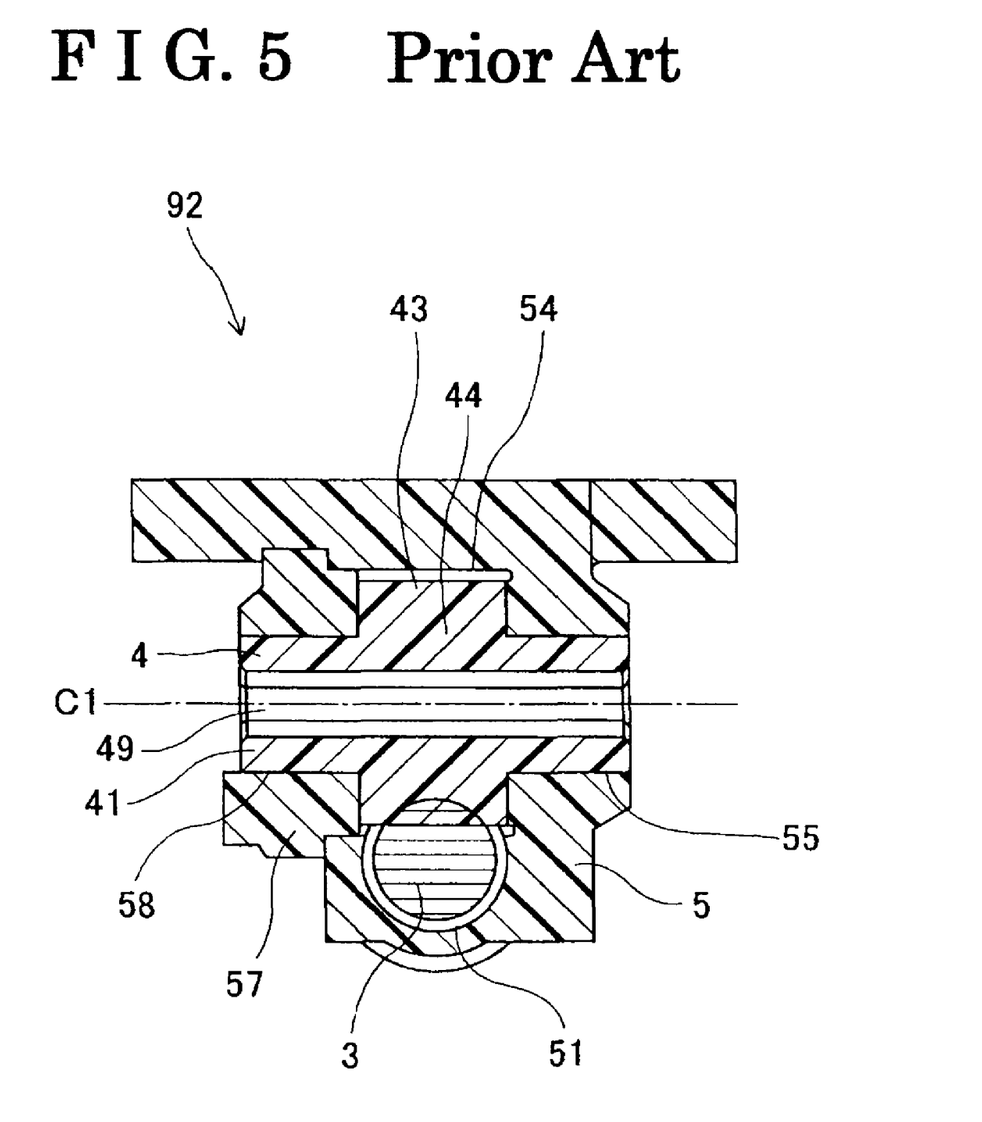
FIG. 5 is a cross-sectional view of a decelerating mechanism according to a known art.

Here, the decelerating mechanism 2, whose cross-sectional diagram is illustrated in FIG. 3, according to the first embodiment will be compared with a known decelerating mechanism 92, whose cross-sectional diagram is illustrated in FIG. 5. According to the known decelerating mechanism 92, annular recessed portions corresponding to the annular recessed portions 6, an annular protruding portion corresponding to the annular protruding portion 71 and an annular protruding portion corresponding to the annular protruding portions 72 are not formed at the decelerating mechanism 92. Alternatively, according to the decelerating mechanism 92, a shaft portion 41 of a helical gear 4 is axially supported by helical gear bearing bores 55 and 58. On the other hand, according to the decelerating mechanism 2 of the first embodiment, the annular recessed portions 6 are engaged with the respective annular protruding portions 71 and 72. In other words, the annular recessed portions 6 and the annular protruding portions 71 and 72 serve also as a bearing portion in order to assist a bearing function of the seat slide apparatus 1. Accordingly, a larger bearing area is ensured for the decelerating mechanism 2 of the first embodiment when comparing to the known decelerating mechanism 92. As a result, according to the first embodiment, a load applied per unit area is decreased, which may result in increasing a mechanical strength of the decelerating mechanism 2. Furthermore, according to the first embodiment, because a length of the bearing portion is elongated in the axial direction, an accuracy in the bearing (i.e. a bearing accuracy) is increased, which may result in decreasing a backlash generated when the helical gear 4 is rotatably driven. Accordingly, the accuracy in engagement (i.e. an engagement accuracy) between the tooth portion 33 of the worm 3 and the tooth portion 43 of the helical gear 4 is increased, which may result in decreasing a shock (i.e. a load) applied to the tooth portion 33 of the worm and the tooth portion 43 of the helical gear 4. As a result, a reliability of the decelerating mechanism 2 of the first embodiment may be increased and a noise generated when the tooth portion 33 of the worm 3 is engaged with the tooth portion 43 of the helical gear 4 may be reduced.

Furthermore, according to the first embodiment, because the radially outer circumferential surface 64 of each of the annular recessed portions 6 of the helical gear 4 is engaged with the auxiliary bearing outer circumferential surface 74 of each of the annular protruding portions 7 of the housing 5 and the bearing cover 57, the bearing portion having a larger diameter is established at the decelerating mechanism 2 when comparing to the known decelerating mechanism 92. Therefore, the decelerating mechanism 2 of the first embodiment has the reliability relative to a restriction of increase of the backlash or a misalignment of the components used at the decelerating mechanism 2, which may occur when the decelerating mechanism 2 is used over a long period of time. On the other hand, even if the annular recessed portions 6 and the annular protruding portions 71 and 72 are formed at the decelerating mechanism 2, changes in total weight is not likely to occur, because changes in weight occurring when the annular recessed portions 6 are formed at the helical gear 4 are offset by changes in weight occurring when the annular protruding portions 71 and 72 are formed. Furthermore, the decelerating mechanism 2 of the first embodiment does not require changes in external shape of the housing 5. In other words, the decelerating mechanism 2 of the first embodiment is adaptable to any existing housing.

Additionally, the annular recessed portions 6 are formed at the stepped portions between the shaft portion 41 and the gear portion 44 of the helical gear 4, respectively, in a substantially symmetric manner relative to a direction orthogonal to the rotational axis C1. Similarly, the annular protruding portion 71 of the housing 5 and the annular protruding portion 72 of the bearing cover 57 are formed in a substantially symmetric manner relative to the direction orthogonal to the rotational axis C1. Accordingly, the advantages and effects described above are further enhanced.

Furthermore, because the load applied to the bearing portion per unit area is decreased, the helical gear 4 and the housing 5 may be made of a resin, instead of a metal. In the case where the helical gear 4 and the housing 5 are made of the resin, the weight of the decelerating mechanism 2 may be reduced. Furthermore, because the resin is easily processed, in other words, because the processing of the helical gear 4 and the housing 5 becomes easier when comparing to processing of the metal-made helical gear 4 and the housing 5, the manufacturing costs of the decelerating mechanism 2, and thus the power seat driving apparatus, are reduced when comparing to the known power seat driving apparatus.

Second Embodiment

Figure 6:
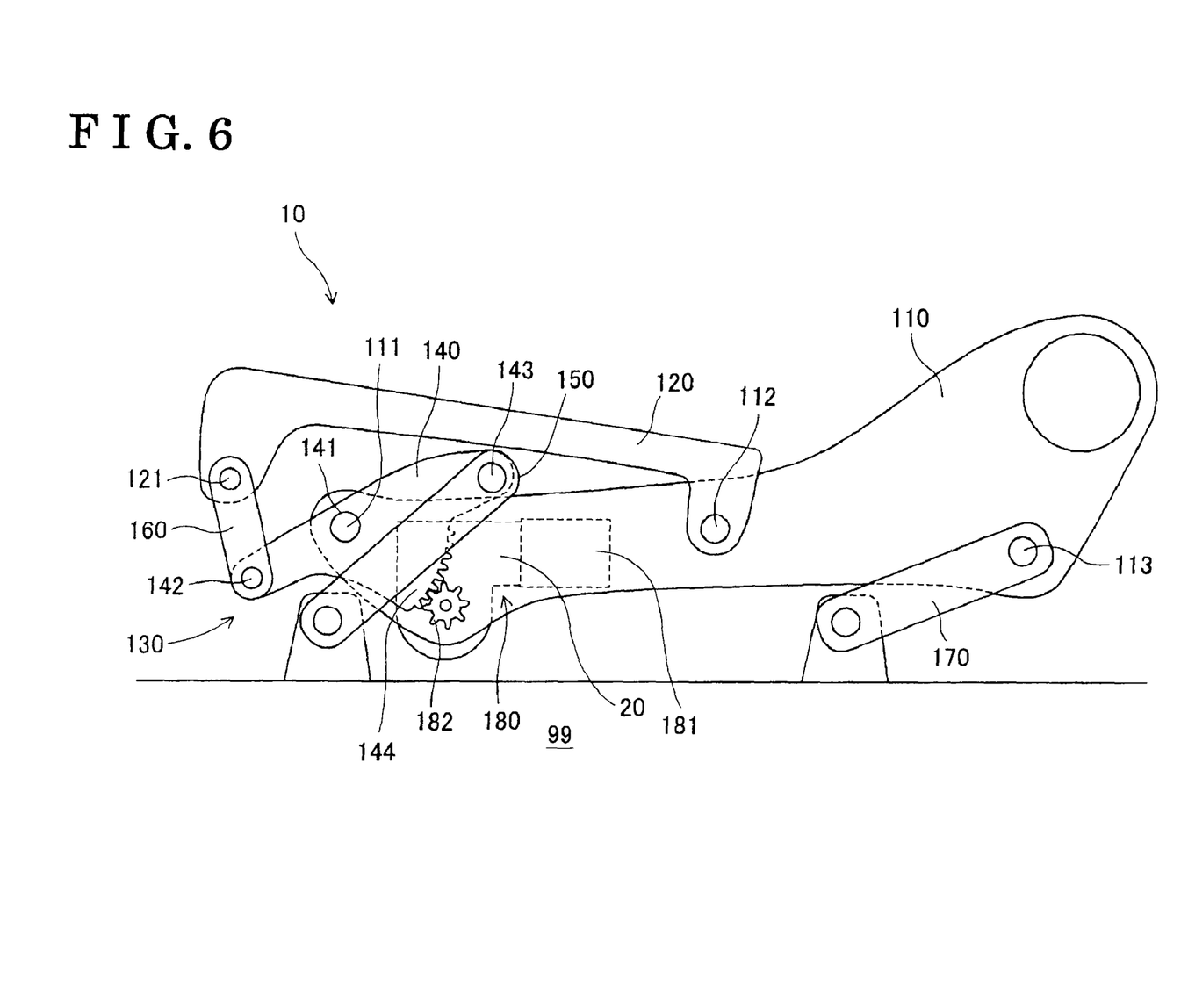
FIG. 6 is a side view illustrating an entire configuration of a seat tilt apparatus for a vehicle according to a second embodiment.

A second embodiment of a power seat driving apparatus for a vehicle (which will be hereinafter referred to as a power seat driving apparatus) will be described below. More specifically, the second embodiment, in which the power seat driving apparatus is adapted to a seat tilt apparatus for a vehicle (which will be hereinafter referred to as a seat tilt apparatus) for adjusting a height of a front portion of a seat cushion in an up-and-down direction, will be described below with reference to FIGS. 6 to 10. Illustrated in FIG. 6 is a side view for explaining an entire configuration example of a seat tilt apparatus 10 of the second embodiment. The seat tilt apparatus 10 includes a pair of side brackets 110, which are arranged in parallel to each other and extend in the front-rear direction of the vehicle in order to support the seat cushion from side portions thereof, a cushion frame 120 for supporting the seat cushion from a bottom side thereof, a pair of front-side pivot-link mechanisms 130 for displacing front portions of the side brackets 110 and a front portion of the cushion frame 120 in the up-and-down direction, a pair of rear-side pivot-link mechanisms 170 for displacing rear portions of the side brackets 110 respectively, a front-side driving device 180 and a rear-side driving device. Hereinafter, a detailed description of the seat tilt apparatus 10 will be given with one of the pair of the side brackets 110 and the components relating thereto as an example, unless otherwise mentioned, because the seat tilt apparatus 10 is formed in substantially symmetric manner relative to the front-rear direction thereof.

A rear portion of the cushion frame 120 is supported by the side bracket 110 by means of a supporting pin 112, which is provided at a substantially intermediate portion of the side bracket 110. The front-side pivot-link mechanism 130 includes a pivot link 140, a front link 150 and a frame pivot link 160. A supporting bore 141 is formed at a substantially intermediate portion of the pivot link 140, so that a supporting pin 111, which is provided at a front end portion of the side bracket 110 is inserted into the supporting bore 141, thereby supporting the pivot link 140 by the side bracket 110. A rear end portion of the pivot link 140 is rotatably connected to an upper rail 99 via the front link 150, which is rotatably connected to the pivot link 140 by means of a first joint portion 143. A front end portion of the pivot link 140 is connected to a front end portion of the cushion frame 120 via the frame pivot link 160. More specifically, the front end portion of the pivot link 140 is pivotably supported by the frame pivot link 160 by means of a second joint portion 142 of the pivot link 140. Furthermore, the front end portion of the cushion frame 120 is pivotably supported by the frame pivot link 160 by means of a supporting pin 121. A sector gear 144 is integrally formed at one of the pair of pivot links 140. More specifically, one of the pair of pivot links 140 includes the sector gear 144, which is formed in a substantially sectorial shape so as to expand towards a rear direction centering on the support bore 141. Additionally, teeth are formed at a rear end portion of the sector gear 144, which forms an arc shape. Furthermore, the pair of the pivot links 140 are connected to each other via a transmission rod, which are arranged coaxially with the supporting pin 111, so that the pair of the pivot links 130 integrally pivot. The rear-side pivot-link mechanism 170 is supported by the side bracket 110 at a rear portion of the rear-side pivot-link mechanism 170 via a supporting pin 113, which is provided at a lower-rear end portion of the side bracket 110.

Furthermore, the rear-side pivot-link mechanism 170 is pivotably supported by the upper rail 99 at a front end portion of the rear-side pivot-link mechanism 170. The side brackets 110, the cushion frame 120 and the like configure the mobile portion of the seat.

The front-side rotating device 180 includes a motor 181, which serves as a driving source for outputting the driving force, and a decelerating portion 20. The decelerating portion 20 includes an output gear 182, which engages with the sector gear 144. The front portion of the side bracket 110 and the front portion of the cushion frame 120 are displaced upwardly by an action of the front-side pivot-link mechanism 130. More specifically, when the output gear 182 is rotatably driven in a counterclockwise direction in FIG. 6, the sector gear 144, which is engaged with the output gear 182, is rotated in a clockwise direction in FIG. 6 and the pivot link 140 is also pivoted in a clockwise direction in response to the rotation of the sector gear 144. Accordingly, the front portions of the side brackets 110 and the front portion of the cushion frame 120 are upwardly displaced. On the other hand, when the output gear 182 is rotatably driven in the clockwise direction in FIG. 6, the pivot link 140 is pivoted in the counterclockwise direction via the sector gear 144, which engages with the output gear 182, thereby downwardly displacing the front portions of the side brackets 110 and the front portion of the cushion frame 120. The rear-side driving device has a similar configuration and function to the front-side driving device 180. More specifically, the rear-side driving device includes a motor and a deceleration portion. When the rear-side driving device pivotably drives the rear-side pivot-link mechanism 170 in the counterclockwise direction, the rear portions of the side brackets 110 are upwardly displaced. On the other hand, when the rear-side driving device pivotably drives the rear-side pivot-link mechanism 170 in the clockwise direction, the rear portions of the side brackets 110 are downwardly displaced.

Figure 7:
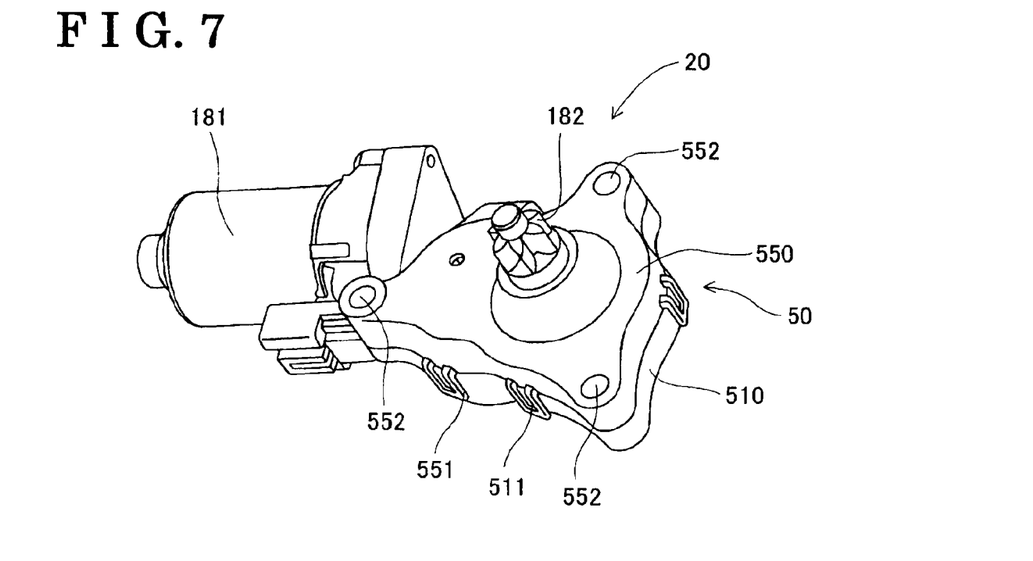
FIG. 7 is a perspective view of a decelerating portion adapted to the seat tilt apparatus for the vehicle.
Figure 8:
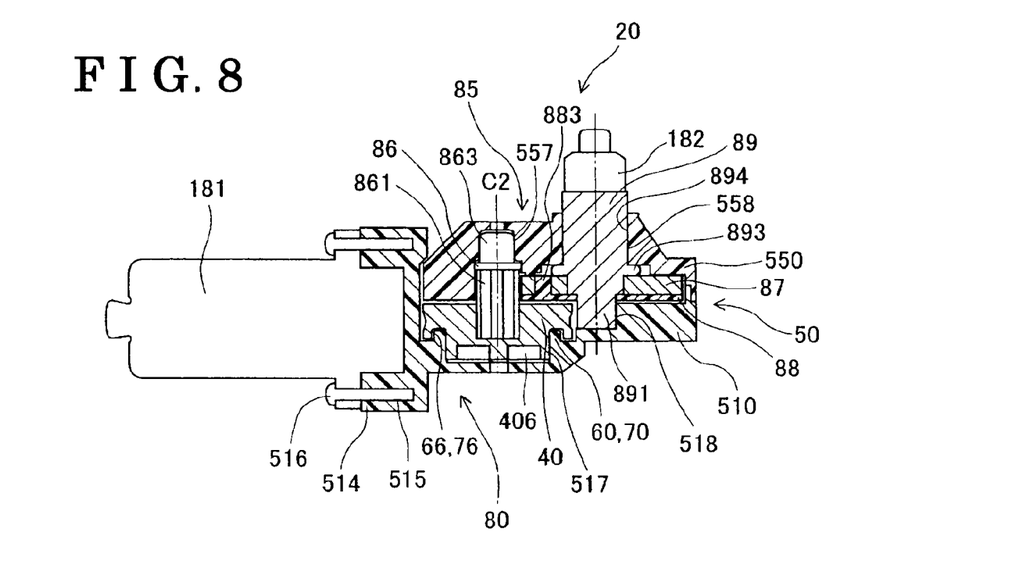
FIG. 8 is a cross-sectional view of the decelerating portion.
Figure 9:
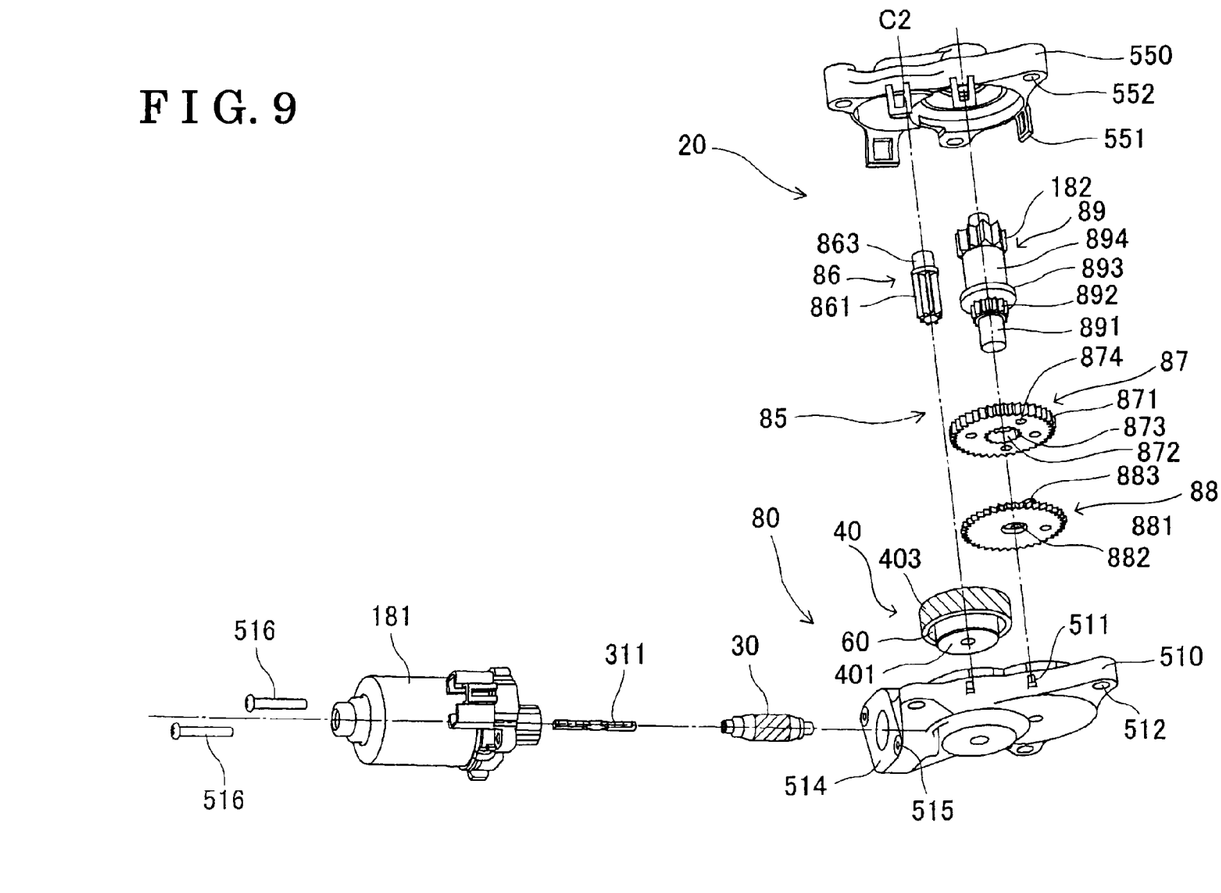
FIG. 9 is an exploded perspective view of the decelerating portion.

A detailed description of the decelerating portions 20 provided at the respective front-side driving device 180 and the rear-side driving device will be given with the decelerating portion 20 of the front-side driving device 180 as an example. Illustrated in FIG. 7 is a perspective view of the decelerating portion 20, which is adapted to the seat tilt apparatus 10 of the second embodiment. Illustrated in FIG. 8 is a cross-sectional view of the decelerating portion 20. Illustrated in FIG. 9 is an exploded perspective view of the decelerating portion 20. The decelerating portion 20 includes a first decelerating portion 80 and a second decelerating portion 85. Furthermore, the decelerating portion 20 is a mechanism for decelerating the driving force generated by the motor 181 at the first decelerating portion 80 and the second decelerating portion 85 and outputting the decelerated driving force to the output gear 182.

A housing 50 of the decelerating portion 20 includes a housing main body 510 and a housing cover 550, each of which is made of resin. More specifically, the housing 50 is configured with the housing main body 510 and the housing cover 550, which are arranged so as to face each other in order to form an accommodation space therebetween (i.e. within the housing 50) for accommodating the first and second decelerating portions 80 and 85. Four engagement portions 511 are provided at a rim of the housing main body 510. Furthermore, four hook portions 551 are provided at the housing cover 550 so as to correspond to the respective four engagement portions 511. The housing main body 510 and the housing cover 550 are tightly connected by engagement between the engagement portions 511 and the hook portions 551, thereby forming the housing 50. However, the present invention is not limited to the above-described configuration in which the housing main body 510 includes four engagement portions 511 and the housing cover 550 includes four hook portions 551. For example, any desired numbers of the engagement portions 511 may be provided at the housing main body 510 and any desired numbers of the hook portions 551 may be provided at the housing cover 550 as long as the housing main body 510 and the housing cover 550 are tightly connected. Furthermore, the housing 50 may be modified so that the engagement portion(s) 511 is formed at the housing cover 550 and the hook portion(s) 551 is formed at the housing main body 510. Three of first attachment bores 512 are provided at the housing main body 510 at the rim thereof. Three of second attachment bores 552 are formed at the housing cover 550 so as to correspond to the respective first attachment bores 512. The housing 50 is integrally attached to the side bracket 110 by means of connecting members, each of which penetrates each of the first attachment bores 512 and each of the second attachment bores 552. As illustrated in FIGS. 8 and 9, a motor supporting flange 514 is formed at the housing main body 510 at the left side thereof in FIGS. 8 and 9. Furthermore, two screw bores 515 are formed at the motor supporting flange 514 in a diagonal manner. The motor 181 is supported by the motor supporting flange 514. More specifically, the motor 181 is fixed to the housing 50 by means of two screws 156, which are screwed into the respective screw bores 515.

A driving portion bearing bore is formed at a back-left side of an inside of the housing main body 510 in FIG. 9. The driving portion bearing bore axially supports a driving portion of the first decelerating portion 80 relative to an axis, which extends in horizontal manner in FIG. 9. A first main body bearing bore 517 is formed at a front-left portion of the inside of the housing main body 510 in FIG. 8. Furthermore, the first main body bearing bore 517 axially supports a driven portion of the first decelerating portion 80 relative to an axis C2, which extends in a vertical manner in FIG. 9. An annular protruding portion 70 is formed on an inner circumferential surface, which defines the first main boy bearing bore 517, so as to extend in a direction of the axis C2. Furthermore, an outer circumferential surface of the annular protruding portion 70 serves as an auxiliary bearing outer circumferential surface 76. A second main body bearing bore 518 is formed at a right portion of the inside of the housing main body 510 in FIG. 8. Furthermore, the second main body bearing bore 518 axially supports a driven portion of the second decelerating portion 85 relative to an axis, which extend in a vertical direction in FIG. 8 and which is indicated by an alternate long and short-dashed line. A first cover bearing bore 557 is formed at a left portion of an inside of the housing cover 550 in FIG. 8. Furthermore, the first cover bearing bore 557 axially supports a driven portion of the first decelerating portion 80 relative to the axis C2. A second cover bearing bore 558 is formed at a right portion of the inside of the housing cover 550 in FIG. 8. Furthermore, the second cover bearing bore 558 axially supports a drive portion of the second decelerating portion 85 relative to the axis extending in parallel to the axis C2.

The first decelerating portion 80 includes a worm 30, which serves as a first driving gear, and a helical gear 40, which serves as a first driven gear. The worm 30 and the helical gear 40 engage with each other. Accordingly, the first decelerating portion 80 largely decelerates the driving force generated by the motor 181 and changes a direction of a transmission path of the driving force by 90 degrees. More specifically, the driving force transmitted from the motor 181 to decelerating portion 80 in a horizontal direction in FIG. 9 is changed so that the driving force transmitted to the decelerating portion 80 is outputted along a transmission path in a vertical direction (i.e. the direction extending along the axis C2) by means of the worm 30 and the helical gear 40. The worm 30 is axially supported at the driving portion bearing bore formed at the housing main body 550 so as to be freely rotatable. Furthermore, the worm 30 is connected to an output shaft of the motor 181 by means of a joint member 311, whose cross-sectional surfaces at both end portions thereof are formed in a quadrangle shape, so that the worm 30 is integrally rotated with the output shaft of the motor 181 in response to the driving force generated by the motor 181.

Figure 10A:
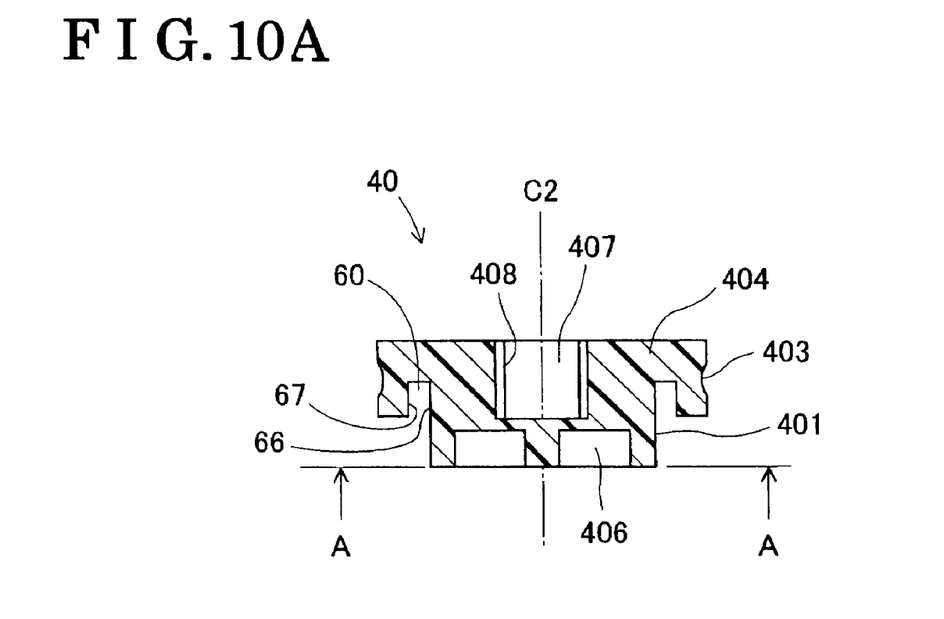
FIG. 10A is a cross-sectional view illustrating a helical gear adapted to the decelerating portion.
Figure 10B:
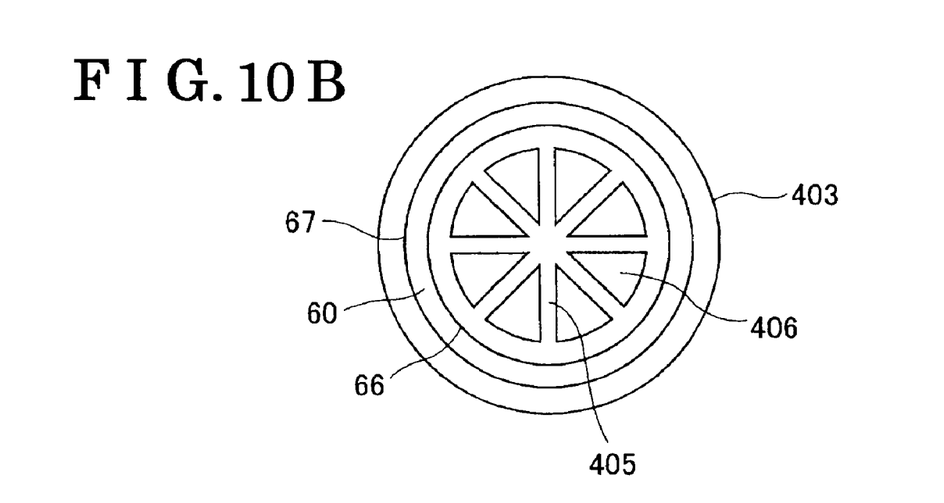
FIG. 10B is a diagram illustrating the helical gear viewed in a direction A indicated in FIG. 10A.

The helical gear 40, which engages with the worm 30, includes a shaft portion 401 and a gear portion 404. The shaft portion 401 is formed in a cylindrical shape so as to extend along the rotational axis C2 in FIG. 9. The gear portion 404 is formed so that a diameter thereof is set to be greater than a diameter of the shaft portion 401. Furthermore, a tooth portion 403 is formed on an outer circumferential surface of the helical gear 40, which engages with a tooth portion formed at the worm 30. Illustrated in FIG. 10A is a cross-sectional view for explaining a configuration example of the helical gear 40 adapted to the decelerating portion 20 of the second embodiment. Illustrated in FIG. 10B is a diagram of the helical gear 40 when being viewed in a direction A indicated in FIG. 10A. As illustrated in FIGS. 10A and 10B, an annular recessed portion 60 is formed at a stepped portion between the gear portion 404 and the shaft portion 401 so as to be centered on the rotational axis C2. A radially inner circumferential surface 66, which defines the annular recessed portion 60, is formed so that a diameter thereof corresponds to a diameter of the shaft portion 401. On the other hand, a radially outer circumferential surface 67, which defines the annular recessed portion 60 and which faces the radially inner circumferential surface 66, is formed so that a diameter of the radially outer circumferential surface 67 becomes smaller than a diameter of a base portion of the tooth portion 403 of the gear portion 404. A reinforcing rib 405, which is configured with ribs that extend radially in eight directions, is provided at a bottom portion of the shaft portion 401 in FIG. 10A. Accordingly, eight spaces (i.e. eight recessed portions), each of which has a bottom surface, are formed at the bottom portion of the shaft portion 401. Furthermore, a shaft bore 407 is formed at the helical gear 40 so as to extend from an end portion of the gear portion 404 to the vicinity of the bottom portion of the shaft portion 407 along the axis C2. Additionally, an inner tooth portion 408 is formed on an inner circumferential surface, which defines the shaft bore 407. As illustrated in FIG. 8, the helical gear 40 is axially supported by the first main body bearing bore 517 of the housing main body 510 at an outer circumferential surface of the shaft portion 401 so as to be freely rotatable. The annular protruding portions 70 is formed at the housing main body 510, so that the annular recessed portion 60 of the helical gear 40 engages with the annular protruding portion 70. Accordingly, the auxiliary bearing outer circumferential surface 76 of the annular protruding portion 70 slidably contacts an outer circumferential surface 66 of the annular recessed portion 60.

The second decelerating portion 85 includes a pinion gear 86, which serves as a second driving gear, a spur gear 87, which serves as a second driven gear, and an elastic gear 88, which serves as an auxiliary gear. Furthermore, the second decelerating portion 85 has a decelerating mechanism that further decelerates the driving force, whose rotational speed is decelerated by the first decelerating portion 80. The pinion gear 86, which serves as the driving gear of the second decelerating portion 85, includes a gear portion 861 and an upper shaft portion 863. The gear portion 861 is formed in a cylindrical shape and includes teeth at an outer circumferential surface thereof. The upper shaft portion 863 is coaxially provided at an upper portion of the gear portion 861 (i.e. a side portion of the gear portion 861) positioned at an upper side in FIG. 9 and has a diameter smaller than a diameter of the gear portion 861. A lower portion of the gear portion 861 is inserted into the shaft bore 407 formed at the helical gear 40, so that the gear portion 861 engages with the inner tooth portion 408 of the shaft bore 407 so as not to be rotatable relative to each other. Accordingly, the pinion gear 86 and the helical gear 40 are integrally rotated. An outer circumferential surface of the upper shaft portion 863 is axially supported at the first cover portion bearing bore 557 of the housing cover 550 so as to be freely rotatable.

On the other hand, the spur gear 87, which serves as a driven gear of the second decelerating portion 85, includes a gear portion 871, a shaft bore 872, an inner tooth portion 873 and a connecting bore 874. The gear portion 871 is formed in a ring shape and includes teeth at an outer circumferential surface thereof. The shaft bore 872 is formed at a substantially center portion of the gear portion 871. The inner tooth portion 873 is formed at an inner circumferential surface of the shaft bore 872. Furthermore, according to the second embodiment, four connecting bores 874 are formed at the second decelerating portion 85 along a circumferential direction centered on an axis of the second decelerating portion 85. The gear portion 871 of the spur gear 78 engages with an upper portion of the gear portion 861 of the pinion gear 86. Accordingly, a deceleration ratio, which is inversely proportional to a ratio between a number of teeth formed at the pinion gear 86 and a number of teeth formed at the gear portion 861, is established.

The elastic gear 88 is a member made of resin and formed in a substantially circular shape. Furthermore, the elastic gear 88 has a lower rigidity and elasticity when comparing to the spur gear 87. The elastic gear 88 includes a gear portion 881, a shaft bore 882 at a substantially center portion of the elastic gear 88 and a connecting protruding portion 883. The gear portion 881 includes a tooth portion at an outer circumferential surface thereof. Furthermore, according to the second embodiment, the elastic gear 88 includes plural connecting protruding portions 883, which are provided at a surface of the elastic gear 88 along a circumferential direction thereof centered on the axis of the second decelerating portion 85 and which extend in an axial direction of the second decelerating portion 85 towards the spur gear 87. A number of teeth formed at the gear portion 881 of the elastic gear 88 is set to be the same as a number of teeth formed at the spur gear 87. However, a tooth thickness of each of the teeth formed at the elastic gear 88 is formed to be thicker than a tooth thickness of each of the teeth formed at the spur gear 87 by a degree by which the backlash is offset. Additionally, the spur gear 87 and the elastic gear 88 are connected to each other by fitting the connecting protruding portions 883 of the elastic gear 88 into the corresponding connecting bores 874 of the spur gear 87. Furthermore, the spur gear 87 and the elastic gear 88 engage with the pinion gear 86 while the spur gear 87 and the elastic gear 88 are rotated at the same phase relative to the pinion gear 86.

An output gear member 89 is further provided to the second decelerating portion 85 in order to output the decelerated driving force and further, in order to axially support the spur gear 87 and the elastic gear 88 so as to be freely rotatable. As illustrated in FIG. 9, the output gear member 89 integrally includes a lower shaft portion 891, an outer tooth portion 892, a flange portion 893, an upper shaft portion 894 and the output gear 182 in this order from a lower portion of the output gear portion 89 towards an upper portion thereof in FIG. 9. The lower shaft portion 891 of the output gear member 89 penetrates through the shaft bore 882 of the elastic gear 88 and is axially supported by the second main body bearing bore 518 of the housing main body 510 so as to be freely rotatable. The outer tooth portion 892 of the output gear member 89 and the inner tooth portion 873 of the spur gear 87 are engaged in a serration-fitting manner so that the output gear member 89 and the spur gear 873 do not rotate relative to each other. Furthermore, the flange portion 893 is disposed between an upper surface of the spur gear 87 in FIG. 9 and an inner wall surface of the housing cover 550. The upper shaft portion 894 of the output gear member 89 is axially supported at the second cover portion bearing bore 558 of the housing cover 550 so as to be freely rotatable. Furthermore, the output gear member 89 is assembled to the housing 50 so that the output gear 182 outwardly protrudes from the housing cover 550. In other words, the output gear member 89 is axially supported at the second main body bearing bore 518 and the second cover portion bearing bore 558, which are formed at an upper and lower portion of the housing 50, respectively, so that the driving force transmitted to the second decelerating portion 85 is outputted to the output gear 182 in a manner where the output gear member 89 is rotatably driven in response to the rotation of the pinion gear 86 integrally with the spur gear 87, which is engaged with the output gear member 89 in the serration-fitting manner.

Operation and function of the seat tilt apparatus 10 according to the second embodiment will be described below with reference to specifically the decelerating portion 20. When the motor 181 is started and actuated so that the driving force having a rotational speed is inputted into the worm 30 of the first decelerating portion 80, the helical gear 40 is driven in response to the rotation of the worm 30 while decelerating the rotational speed of the driving force. Accordingly, a first deceleration of the driving force generated by the motor 181 is executed as mentioned above. Then, when the rotation (i.e. the decelerated rotational speed of the driving force) is transmitted to the pinion gear 86 of the second decelerating portion 85, which integrally rotates with the helical gear 40, the spur gear 87 and the elastic gear 88 are driven in response to the rotation transmitted to the second deceleration portion 85 while further decelerating the rotational speed of the driving force. Accordingly, a second deceleration of the driving force generated by the motor 181 is executed as mentioned above. The driving force, which is decelerated at two stages (i.e. the first and second decelerating portions 80 and 85), is changed to a low-speed large torque. The low-speed large torque is outputted from the output gear 182, thereby rotating the sector gear 144 (see FIG. 6). Accordingly, the mobile portion (e.g. the side brackets 110, the cushion frames 120 and the like) is moved upwardly and downwardly.

When focusing specifically on the first decelerating portion 80, the annular recessed portion 60 is formed at one side of the helical gear 40 in an axial direction thereof and the annular protruding portion 70 is formed at the housing 50 so as to correspond to the annular recessed portion 60. However, the first decelerating portion 80 has advantages and effects similar to the first embodiment, in a view where the bearing area of the bearing portion is enlarged when comparing to the known decelerating mechanism and where the length of the bearing portion is elongated, which may result in enhancing the accuracy in bearing. Furthermore, according to the second embodiment, the helical gear 40 is made of resin, and the spaces 406 (i.e. the recessed portions 406), which are defined by the reinforcing rib 504, are formed at the bottom portion of the helical gear 40. Accordingly, the weight of the helical gear 40 is further reduced when comparing to the helical gear 4 of the first embodiment. Furthermore, because the helical gear 40 is made of resin, the helical gear 40 is easily processed. Moreover, the helical gear 40 is prevented from being affected by a strain, which may occur due to a heat construction, thereby increasing an accuracy in shape of the helical gear 40. As a result, the occurrence of the backlash may be further decreased.

On the other hand, when focusing specifically on the second decelerating portion 85, the tooth thickness of the tooth formed at the elastic gear 88 is formed to be thicker than the tooth thickness of the tooth formed at the spur gear 87 by the degree by which the backlash is offset. Accordingly, the elastic gear 87 and the pinion gear 86 are engaged in a state where a minimal backlash is generated therebetween, while the pinion gear 86 and the spur gear 87 are engaged in a state where the backlash is likely to be generated. Therefore, when the output rotational speed of the motor 181 is decreased and the rotational speed of the pinion gear 86 is decreased, the elastic gear 88 is less likely to be idly rotated by an inertia by the degree of the backlash. Even if the elastic gear 88 idly rotates when the output rotational speed of the motor 181 is decreased and the rotational speed of the pinion gear 86 is decreased, a stress, a noise and the like generated when the tooth portion 871 of the spur gear 87 contacts the gear portion 861 of the pinion gear 86 is restricted to a minimum. In other words, even if the spur gear 87 idly rotates by the inertia by the degree of the backlash, the idle rotation of the spur gear 87 is restricted by the elastic gear 88, which is rotated in response to the rotation of the spurt gear 87. Therefore, in practice, the backlash is not likely to be generated. Furthermore, because the elastic gear 88 is made of the resin having the low rigidity and elasticity, the elastic gear 88 has a relatively great resistance relative to an instantaneous great deformation. Therefore, the elastic gear 88 stops the idle rotation of the spur gear 87. On the other hand, in a normal rotation transmission, i.e. when the rotation is normally transmitted from the pinion gear 86 to the spur gear 87, the elastic gear 88 is elastically deformed, which may result in allowing the spur gear 87 to be smoothly driven.

Accordingly, the occurrence of the backlash is decreased in total by the decelerating portion 20, which includes the first decelerating portion 80 and the second decelerating portion 85. As a result, the reliability of the decelerating portion 20 may be increased. Furthermore, the entire decelerating portion 20 may be made of the resin.

Additionally, the decelerating mechanism 2 of the first embodiment and the decelerating portion 20 of the second embodiment may be modified so that an annular recessed portion is formed at the worm 3 of the first embodiment and the worm 30 of the second embodiment and so that an annular protruding portion is formed at the housing 5 of the first embodiment and the housing 50 of the second embodiment.

According to the first embodiment, the power seat driving apparatus is adapted to the seat slide apparatus 1 for adjusting the position of the seat in the front-rear direction. Furthermore, according to the second embodiment, the power seat driving apparatus is adapted to the seat tilt apparatus 10 for adjusting a position of the front portion of the seat cushion in the up-and-down direction. However, the present invention is not limited to the above-described embodiments. For example, the power seat driving apparatus may be adapted to an apparatus, in which a driving force generated by the driving source is decelerated and transmitted to a moving unit so as to displace the moving unit. More specifically, the power seat driving apparatus according to the first and second embodiments may be adapted to, for example, a seat lifter apparatus for moving an entire seat cushion in the up-and-down direction.

Furthermore, the power seat driving apparatus according to the first and second embodiments may be adapted to an apparatus having a motor and a decelerating mechanism, such as a power window apparatus for a vehicle and the like. Even in this case, a size and a weight of the apparatus having the motor and the decelerating mechanism may be decreased. Furthermore, the power seat driving apparatus according to the first and second embodiment may contribute to increase a reliability of the apparatus to which the power seat driving apparatus according to the first and second embodiment is adapted.

Accordingly, the annular recessed portion (6, 60) is formed at least one of the worm (the driving gear) (3, 30) and the helical gear (the driven gear) (4, 40). More specifically, the annular recessed portion (6, 60) is formed at least one of the stepped portion between the gear portion (33, 44, 404) and the shaft portion (31, 32, 41, 401). The housing (5, 50) includes the annular protruding portion (71, 70), which is fitted into the annular recessed portion (6, 60). The engagement between the annular recessed portion (6, 60) and the annular protruding portion (71, 70) enhances the bearing function between the shaft portion (31, 32, 41, 401) of the at least one of the worm (3, 30) and the helical gear (4, 40) on the one hand and the bearing bore (55, 517) on the other. Accordingly, the bearing area of the bearing portion is increased when comparing to the known power seat driving apparatus. As a result, the load applied per unit area is decreased, thereby enhancing the mechanical strength of the power seat driving apparatus. Furthermore, because the length of the bearing portion in the axial direction is elongated due to the engagement between the annular recessed portion (6, 60) and the annular protruding portion (71, 70), the accuracy in bearing is increased, which my further result in reducing the occurrence of the backlash. Accordingly, the engagement accuracy of the gears (3, 4/30, 40) may be increased, which may result in reducing the shock applied to the teethe potion of the gears (3, 30, 4, 40). As a result, the reliability of the power seat driving apparatus may be increased and the noise generated when the worm (3, 30) and the helical gear (4, 40) are engaged may be reduced.

Accordingly, because the radially outer circumferential surface (64, 67) of the annular recessed portion (44, 404) of the one of the worm (3, 30) and the helical gear (4, 40) slidably contacts the auxiliary bearing outer circumferential surface (74, 76) of the annular protruding portion (6, 60) of the housing (5, 50), a larger bearing portion is formed. Therefore, the power seat driving apparatus according to the first and second embodiments has the reliability relative to a restriction of the increase of the backlash or the misalignment of the components used at the power seat driving apparatus, which may occur when the power seat driving apparatus is used over a long period of time. On the other hand, even if the annular recessed portion (6, 60) and the annular protruding portion (71, 70) are formed at the power seat driving apparatus, changes in total weight are not likely to occur, because changes in weight occurring when the annular recessed portion (6, 60) is formed are offset by changes in weight occurring when the annular protruding portion (71, 70) is formed. Furthermore, the power seat driving apparatus of the first and second embodiments does not require changes in external shape of the housing (5, 50). In other words, the power seat driving apparatus of the first and second embodiments is adaptable to any existing housing.

According to the embodiments, the driving gear is the worm (3, 30) and the driven gear is the helical gear (4, 40).

Accordingly, the mechanical strength, the accuracy in bearing and the gear engagement accuracy of the decelerating mechanism (2, 20), which includes the worm (3, 30) and the helical gear (4, 40), may be increased.

According to the first embodiment, the annular recessed portion (6) is formed at both stepped portions between the shaft portion (41) and the gear portion (44) of the at least one of the worm (3) and the helical gear (4) in the axial direction of the gear portion (41). Furthermore, the housing (5) includes the bearing bore (55) and the annular protruding portion (71) so as to correspond to shapes of the shaft portion (41) and the annular recessed portion (6), respectively.

Accordingly, the annular recessed portions (6) are formed at both of the stepped portions formed between the gear portion (44) and the shaft portion (41) of at least one of the worm (3) and the helical gear (4) in the axial direction. The bearing bore (55) formed at the housing (5) supports the shaft portion (41) of at least one of the worm (3) and the helical gear (4) in the axial direction. Furthermore, the annular protruding portion (71) of the housing (5) is fitted into the annular recessed portion (6), so that at least one of the worm (3) and the helical gear (4) is supported by the housing (5). Accordingly, the accuracy in bearing of the bearing portion is further enhanced, which may result in reducing the backlash generated when the worm (3) and the helical gear (4) are engaged and therefore, enhancing the gear engagement accuracy. As a result, the reliability of the power seat driving apparatus is further enhanced.

According to the embodiments, the housing (5, 50) and at least one of the worm (3, 30) and the helical gear (4, 40) are made of resin.

Accordingly, because the load applied to the bearing portion per unit area is decreased, the housing (5, 50) and at least one of the worm (3, 30) and the helical gear (4, 40) may be made of resin instead of metal. In the case where the housing (5, 50) and at least one of the worm (3, 30) and the helical gear (4, 40) are made of the resin, the weight of the power seat driving apparatus may be reduced. Furthermore, because the resin is easily processed, the manufacturing costs of the power seat driving apparatus may be reduced.

According to the second embodiment, the shaft portion (401) of the at least one of the worm (30) and the helical gear (40) includes the space (406), which is defined by the reinforcing rib (405).

Accordingly, at least one of the worm (30) and the helical gear (40) is made of the resin. Furthermore, the shaft portion (401) of the at least one of the worm (30) and the helical gear (40) includes the reinforcing rib (405) having the ribs extending in different directions, so that plural spaces (406) are formed within the shaft portion (401). By forming the spaces (406) within the shaft portion (401), the weight of at least one of the worm (30) and the helical gear (40) is further reduced, while the mechanical strength of at least one of the worm (30) and the helical gear (40) is ensured by means of the reinforcing rib (405). Furthermore, by providing the spaces (406) within the shaft portion (401), the processing of at least one of the worm (30) and the helical gear (40) is facilitated. Moreover, at least one of the worm (30) and the helical gear (40), to which the reinforcing rib (405) is provided, is prevented from being affected by a strain, which may occur due to the hear construction, thereby increasing the accuracy in shape of at least one of the worm (30) and the helical gear (40). As a result, the occurrence of the backlash may be further decreased.

According to the second embodiment, the decelerating mechanism (2) includes a first decelerating portion (80), including the worm (30) and the helical gear (40), and a second decelerating portion (85). The second decelerating portion (85) includes the pinion gear (86) integrally rotated with the helical gear (40) and the spur gear (87) engaging with the pinion gear (86) so as to be rotatably driven in response to the rotation of the pinion gear (86) while decelerating the rotational speed transmitted from the pinion gear (86) to the spur gear (87), and an elastic gear (88) formed coaxially with the spur gear (87) and connected to the spur gear (87) so as to be integrally rotated. The elastic gear (88) is made of resin having a low rigidity and elasticity comparing to the spur gear (87) and is formed so that the tooth thickness of teeth formed at the elastic gear (88) is formed to be thicker than the tooth thickness of the spur gear (87) by the degree by which the backlash is offset. Furthermore, the elastic gear (88) is engaged with the pinion gear (86) together with the spur gear (87). The housing (50) rotatably supports the pinion gear (86), the spur gear (87) and the elastic gear (88), as well as the worm (30) and the helical gear (40).

Accordingly, the decelerating mechanism (2) further includes the second decelerating portion (85), which is configured with the pinion gear (86) and the spur gear (87), within the housing (50), so that the driving force generated by the driving source is further greatly decelerated. Furthermore, the decelerating mechanism (2) includes the elastic gear (88), which is integrally rotated with the spur gear (87). Accordingly, because the elastic gear (88) engages with the pinion gear (86), the backlash generated at the decelerating mechanism (2) is reduced comprehensively. As a result, the reliability of the power seat driving apparatus may be increased. Additionally, the entire decelerating mechanism (2) may be made of the resin.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A power seat driving apparatus for a vehicle comprising:
   a moving unit adapted to be arranged between a seat and a vehicle floor so as to move the seat relative to the vehicle floor; and
   a decelerating mechanism connected to the moving unit, decelerating a driving force generated by a driving source and transmitting a decelerated driving force to the moving unit, wherein
   the decelerating mechanism includes a driving gear to which the driving force generated by the driving source is inputted, a driven gear engaged with the driving gear so as to be rotatably driven in response to a rotation of the driving gear while decelerating a rotational speed of the driving force transmitted to the driving gear, and a housing rotatably supporting the driving gear and the driven gear,
   at least one of the driving gear and the driven gear includes a shaft portion formed in a cylindrical shape so as to extend along a rotational axis, and a gear portion formed coaxially with the shaft portion so that a diameter of the gear portion is set to be greater than a diameter of the shaft portion and including a tooth portion, which engages with a tooth portion formed at the other one of the driving gear and the driven gear,
   an annular recessed portion is formed at a stepped portion between the gear portion and the shaft portion so as to be coaxial with the rotational axis, the annular recessed portion includes a radially inner circumferential surface whose diameter is set to be the same as the diameter of the shaft portion and a radially outer circumferential surface, whose diameter is set to be smaller than a diameter of a base portion of the tooth portion, and
   the housing includes a bearing bore having a bearing surface, which contacts an outer circumferential surface of the shaft portion and the radially inner circumferential surface of the annular recessed portion and an annular protruding portion, which is fitted into the annular recessed portion and which includes an auxiliary bearing outer circumferential surface contacting the radially outer circumferential surface.

2. The power seat driving apparatus according to claim 1, wherein the driving gear is a worm and the driven gear is a helical gear.

3. The power seat driving apparatus according to claim 1, wherein the annular recessed portion is formed at both stepped portions between the shaft portion and the gear portion of the at least one of the driving gear and the driven gear in an axial direction of the gear portion, and the housing includes the bearing bore and the annular protruding portion so as to correspond to shapes of the shaft portion and the annular recessed portion, respectively.

4. The power seat driving apparatus according to claim 2, wherein the annular recessed portion is formed at both stepped portions between the shaft portion and the gear portion of the at least one of the driving gear and the driven gear in an axial direction of the gear portion, and the housing includes the bearing bore and the annular protruding portion so as to correspond to shapes of the shaft portion and the annular recessed portion, respectively.

5. The power seat driving apparatus according to claim 1, wherein the housing and at least one of the driving gear and the driven gear are made of resin.

6. The power seat driving apparatus according to claim 2, wherein the housing and at least one of the driving gear and the driven gear are made of resin.

7. The power seat driving apparatus according to claim 3, wherein the housing and at least one of the driving gear and the driven gear are made of resin.

8. The power seat driving apparatus according to claim 4, wherein the housing and at least one of the driving gear and the driven gear are made of resin.

9. The power seat driving apparatus according to claim 5, wherein the shaft portion of the at least one of the driving gear and the driven gear includes a space, which is defined by a reinforcing rib.

10. The power seat driving apparatus according to claim 6, wherein the shaft portion of the at least one of the driving gear and the driven gear includes a space, which is defined by a reinforcing rib.

11. The power seat driving apparatus according to claim 7, wherein the shaft portion of the at least one of the driving gear and the driven gear includes a space, which is defined by a reinforcing rib.

12. The power seat driving apparatus according to claim 8, wherein the shaft portion of the at least one of the driving gear and the driven gear includes a space, which is defined by a reinforcing rib.

13. The power seat driving apparatus according to claim 1, wherein the decelerating mechanism includes a first decelerating portion, including a first driving gear and a first driven gear, and a second decelerating portion, the second decelerating portion includes a second driving gear integrally rotated with the first driven gear and a second driven gear engaging with the second driving gear so as to be rotatably driven in response to a rotation of the second driving gear while decelerating a rotational speed transmitted from the second driving gear to the second driven gear, and an auxiliary gear formed coaxially with the second driven gear and connected to the second driven gear so as to be integrally rotated, the auxiliary gear is made of a resin having a low rigidity and elasticity comparing to the second driven gear and is formed so that a tooth thickness of teeth formed at the auxiliary gear is formed to be thicker than a tooth thickness of the second driven gear by a degree by which a backlash is offset, the auxiliary gear engaged with the second driving gear together with the second driven gear, and wherein the housing rotatably supports the second driving gear, the second driven gear and the auxiliary gear, as well as the first driving gear and the first driven gear.

14. The power seat driving apparatus according to claim 2, wherein the decelerating mechanism includes a first decelerating portion, including a first driving gear and a first driven gear, and a second decelerating portion, the second decelerating portion includes a second driving gear integrally rotated with the first driven gear and a second driven gear engaging with the second driving gear so as to be rotatably driven in response to a rotation of the second driving gear while decelerating a rotational speed transmitted from the second driving gear to the second driven gear, and an auxiliary gear formed coaxially with the second driven gear and connected to the second driven gear so as to be integrally rotated, the auxiliary gear is made of a resin having a low rigidity and elasticity comparing to the second driven gear and is formed so that a tooth thickness of teeth formed at the auxiliary gear is formed to be thicker than a tooth thickness of the second driven gear by a degree by which a backlash is offset, the auxiliary gear engaged with the second driving gear together with the second driven gear, and wherein the housing rotatably supports the second driving gear, the second driven gear and the auxiliary gear, as well as the first driving gear and the first driven gear.

15. The power seat driving apparatus according to claim 3, wherein the decelerating mechanism includes a first decelerating portion, including a first driving gear and a first driven gear, and a second decelerating portion, the second decelerating portion includes a second driving gear integrally rotated with the first driven gear and a second driven gear engaging with the second driving gear so as to be rotatably driven in response to a rotation of the second driving gear while decelerating a rotational speed transmitted from the second driving gear to the second driven gear, and an auxiliary gear formed coaxially with the second driven gear and connected to the second driven gear so as to be integrally rotated, the auxiliary gear is made of a resin having a low rigidity and elasticity comparing to the second driven gear and is formed so that a tooth thickness of teeth formed at the auxiliary gear is formed to be thicker than a tooth thickness of the second driven gear by a degree by which a backlash is offset, the auxiliary gear engaged with the second driving gear together with the second driven gear, and wherein the housing rotatably supports the second driving gear, the second driven gear and the auxiliary gear, as well as the first driving gear and the first driven gear.

16. The power seat driving apparatus according to claim 5, wherein the decelerating mechanism includes a first decelerating portion, including a first driving gear and a first driven gear, and a second decelerating portion, the second decelerating portion includes a second driving gear integrally rotated with the first driven gear and a second driven gear engaging with the second driving gear so as to be rotatably driven in response to a rotation of the second driving gear while decelerating a rotational speed transmitted from the second driving gear to the second driven gear, and an auxiliary gear formed coaxially with the second driven gear and connected to the second driven gear so as to be integrally rotated, the auxiliary gear is made of a resin having a low rigidity and elasticity comparing to the second driven gear and is formed so that a tooth thickness of teeth formed at the auxiliary gear is formed to be thicker than a tooth thickness of the second driven gear by a degree by which a backlash is offset, the auxiliary gear engaged with the second driving gear together with the second driven gear, and wherein the housing rotatably supports the second driving gear, the second driven gear and the auxiliary gear, as well as the first driving gear and the first driven gear.

17. The power seat driving apparatus according to claim 9, wherein the decelerating mechanism includes a first decelerating portion, including a first driving gear and a first driven gear, and a second decelerating portion, the second decelerating portion includes a second driving gear integrally rotated with the first driven gear and a second driven gear engaging with the second driving gear so as to be rotatably driven in response to a rotation of the second driving gear while decelerating a rotational speed transmitted from the second driving gear to the second driven gear, and an auxiliary gear formed coaxially with the second driven gear and connected to the second driven gear so as to be integrally rotated, the auxiliary gear is made of a resin having a low rigidity and elasticity comparing to the second driven gear and is formed so that a tooth thickness of teeth formed at the auxiliary gear is formed to be thicker than a tooth thickness of the second driven gear by a degree by which a backlash is offset, the auxiliary gear engaged with the second driving gear together with the second driven gear, and wherein the housing rotatably supports the second driving gear, the second driven gear and the auxiliary gear, as well as the first driving gear and the first driven gear.

* * * * *